May 27, 1952 E. L. CROSTON 2,597,923
PRESS MECHANISM AND FEED MEANS THEREFOR
Filed June 2, 1947 2 SHEETS—SHEET 1
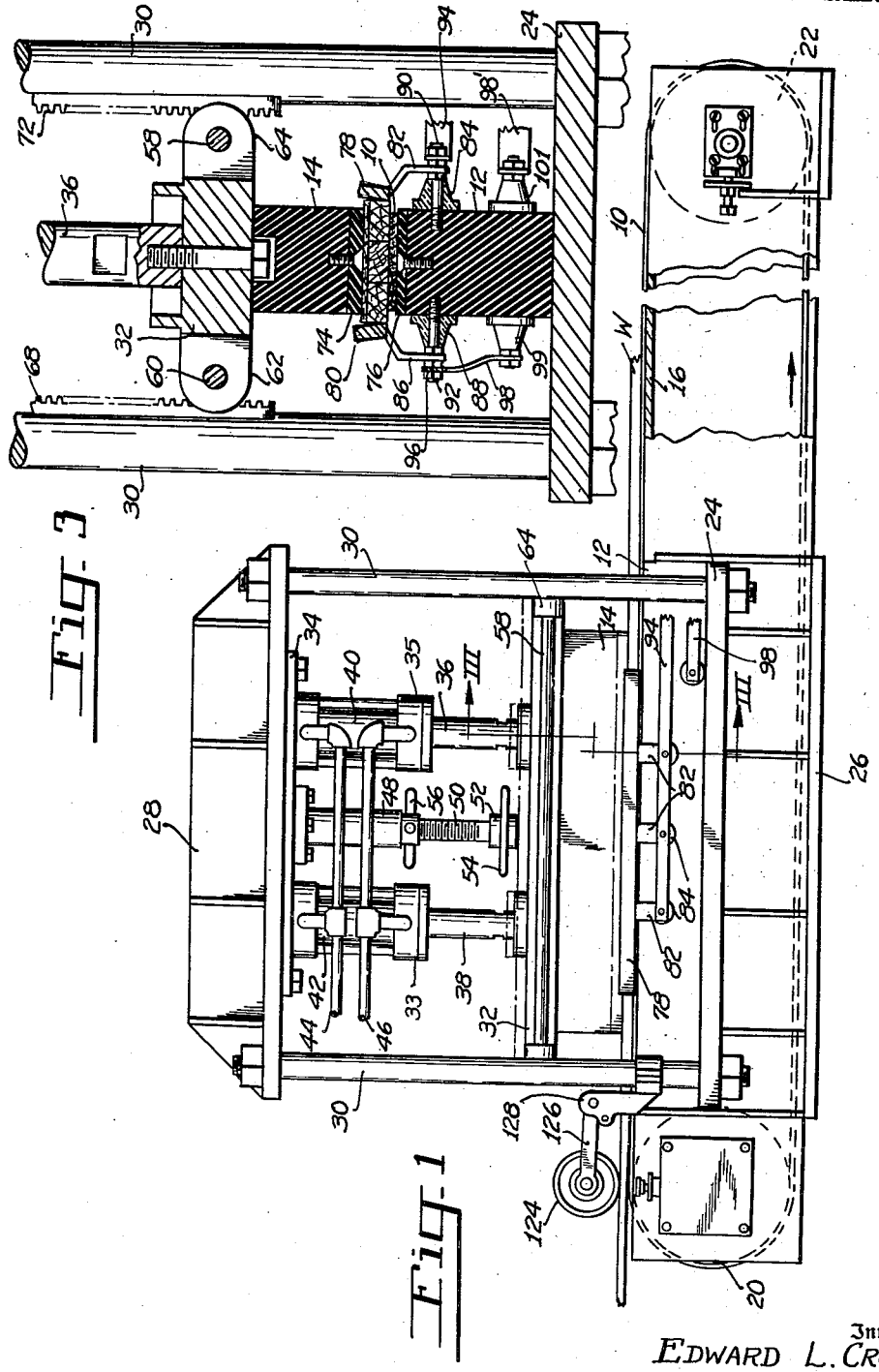
Inventor
EDWARD L. CROSTON
By Reynolds + Beach
Attorneys May 27, 1952   E. L. CROSTON   2,597,923
PRESS MECHANISM AND FEED MEANS THEREFOR
Filed June 2, 1947   2 SHEETS—SHEET 2
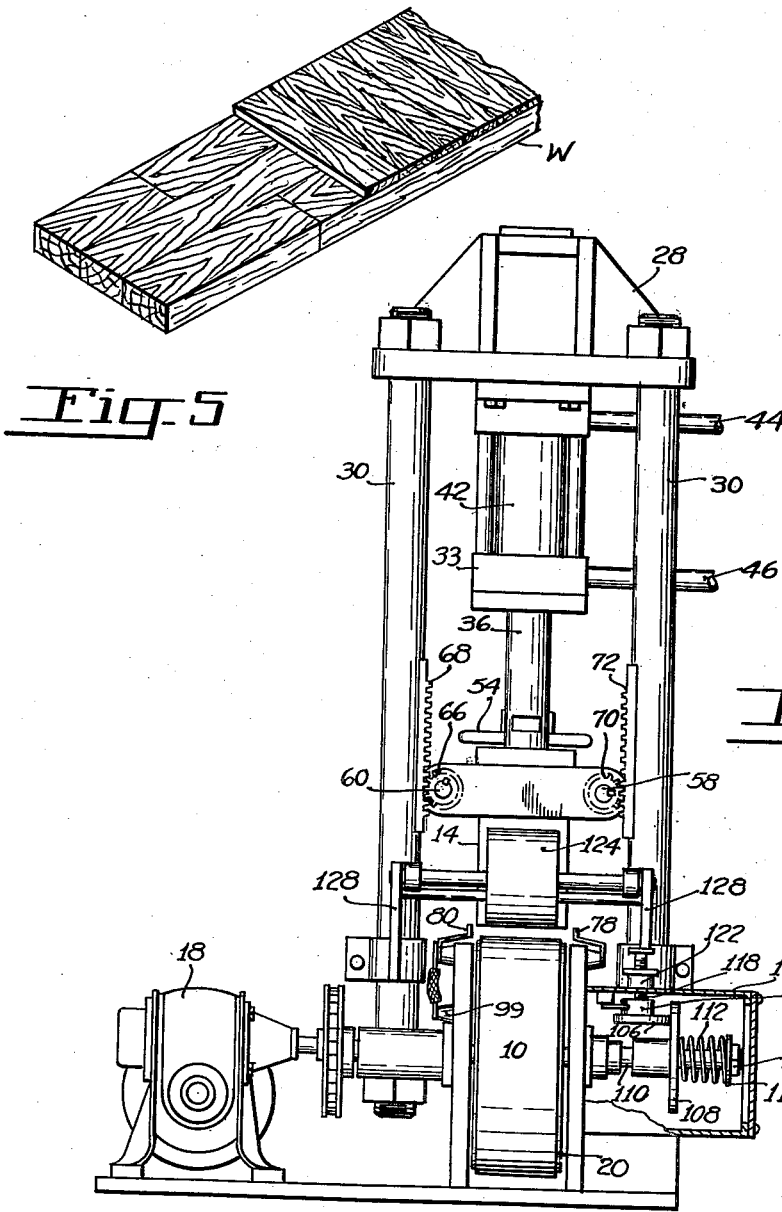
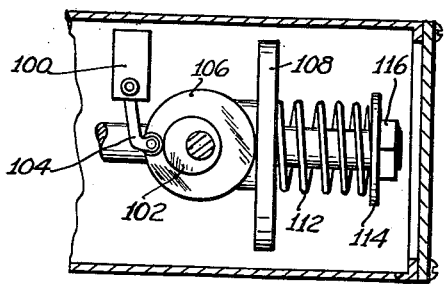
Inventor
EDWARD L. CROSTON
By Reynolds + Beach
Attorneys Patented May 27, 1952

2,597,923

UNITED STATES PATENT OFFICE 2,597,923

PRESS MECHANISM AND FEED MEANS THEREFOR

Edward L. Croston, Dash Point, Wash., assignor to American Manufacturing Company, Inc., Tacoma, Wash., a corporation of Washington Application June 2, 1947, Serial No. 751,705

7 Claims. (Cl. 144—281)

This invention relates to high-frequency dielectric heating apparatus adapted for and a method of manufacturing laminated boards from shorter strips of wood or similar materials, with which apparatus boards of practically any length may be produced in a continuous process substantially automatically. Illustratively, a laminated board may be formed from contacting layers of flat strips, the separate layers being bonded together at their interface, with the constituent strips of one layer lying in staggered relation in parallel rows extending lengthwise of the composite board, and the strips or slats of the superimposed layer running crosswise of the board. It is of great economical value thus to be able to salvage short scrap pieces of wood by their utilization in the manufacture of boards or planks. Moreover boards thus formed possess qualities of strength and resistance to shrinkage and warpage surpassing those even of single pieces of wood of the same size. Such composite boards can be used structurally as well as ornamentally, owing to the strength of commercially available thermoactive adhesives which may be used.

Among the various performance requisites of a machine capable of performing the above operation is that of holding the adhesively coated pieces together in their desired positional relationship while they are being moved into bonding position in the machine, and thereafter while they are being bonded under compacting pressure and the heat of a high-frequency field activating the bonding adhesive. Moreover, it is important that the heat and pressure be applied uniformly over the board during its manufacture. Preferably the machine effects an intermittent movement of the work through an operating station, in which the work is pressed over successive areas, yet the operation is rapid, may be accomplished automatically, and conserves high-frequency electrical energy used in activating the adhesive. When dealing with small scrap pieces in the foregoing manner the problem is more difficult than in bonding larger pieces, because of the special handling technique required.

To devise a machine having all of these and other desirable features is the general object of the present invention, which I accomplish in a machine employing intermittent feed movement of the work and intercoordinated application of heat and pressure, applied progressively upon successive lengthwise sections of each board so produced. Moreover, the work feeding and guiding means, and the press members, must be so designed and so positioned relative to the electrodes as not to interfere with the electric field employed in activating the adhesive, and their presence must not create undesired large capacities between them and one or more electrodes. In a word, it is an object to provide suitable mechanism capable of operating in the prescribed way, in an arrangement in which the electrodes may be electrically substantially isolated from metallic parts at other potentials, such as ground potential.

In the description which follows the foregoing and other features of the invention are set forth in detail by reference to the accompanying drawings, which illustrate the preferred form of my machine and its several features.

Figure 1 is a side elevation view of my machine, and Figure 2 is an end elevation view of the same.

Figure 3 is a fragmentary sectional view of the machine, taken along the line III—III of Figure 1, showing the press blocks and the construction and manner of mounting the electrodes on them.

Figure 4 is a detail sectional view showing switching mechanism for coordinating the operations of the machine as a function of the movement of the carrier belt.

Figure 5 is a perspective view of part of a section of laminated board which may be manufactured with the use of the present machine.

The basic components of this machine include a press, a high-frequency heating system including electrodes stationed alongside the press blocks to pass a field through the work when it is under the pressure of the blocks, a carrier-belt mechanism for advancing the work between the blocks of the press, and mechanism coordinating the several operations of the machine. In achieving the foregoing objects I employ elongated, thick press blocks 12 and 14 of dielectric material of suitable electrical and mechanical qualities, the blocks lying in vertical registering relationship and the lower block 12 being mounted stationarily on the bed 24 of the machine. The work pieces are assembled on an endless carrier belt 10 of insulating material, one run of which passes between the press blocks for carrying the work pieces between them. To prevent its sagging, the work-supporting belt slides lengthwise over the upper surface of the lower press block 12. The principal layer of adhesive which it is desired to activate is that lying in a transverse plane, parallel to the coacting faces of the press blocks, between the lengthwise and the crosswise layers of work strips; consequently for efficient electric field utilization elongated parallel electrodes 78 and 80, extending lengthwise of and lying adjacent to the working surfaces of the press blocks, are provided at each side of the belt parallel to the line of work movement.

The electrodes 78 and 80 are supported by inwardly acting spring members 82 and 86, respectively, which press them laterally lightly against the sides of the work W, thus avoiding air gaps in series with the electric field while holding the work pieces together. The electrodes therefore serve also as work guides. In the operation of the machine, each time a new, unbonded section of the board being manufactured has been advanced into position between the electrodes and press blocks, the belt 10 is stopped automatically by suitable control mechanism coacting with the belt drive mechanism, concurrently the press blocks 12 and 14 are closed together with the work and one side of the belt compacted between them, and high frequency electrical energy is supplied to the electrodes for activating the adhesive. The process is repeated intermittently on successive lengths of the board until a board of the total desired length is attained, new stock as necessary being placed on the belt for movement into the bonding station to be integrated adhesively with the outgoing sections thus bonded.

Following each application of heat and pressure in bonding together the constituent pieces of a section of board, the belt 10 is again set into motion, bringing the succeeding, unbonded section of the work W between the electrodes 78 and 80 and the press blocks 12 and 14. During this movement, the new work section is guided laterally by its lower layer being gripped lightly between the electrodes. The bonded sections of board are held against the belt to move with it, a weighted roller 124 pressing the board against the carrier belt 10. This use of the roller guards against any possible slippage between work pieces and belt. As a result of the electrodes contacting only the lower layer of the work, that supported on the conveyor belt, the upper or transverse layer is not retarded relative to the lower layer, by frictional resistance of the electrodes. The heating electric field passing through the work between the electrodes is caused to follow generally a path directed first transversely to the plane of the adhesive, between upper and lower layers, then along or parallel to the plane of the adhesive, then away from such plane again, in passing from one electrode to the other at their respective zones of contact with the work.

In accordance with another feature of my invention the press blocks 12 and 14 are formed substantially of dielectric material only, such as sheets of resin impregnated fibrous material, laminated preferably with an amine or amide formaldehyde resin, the preferred example being a laminated structure of melamine-formaldehyde bonded fish paper or other fiber material, the sheets being perpendicular to the direction of relative movement of the press platens in opening and closing. Any such material must be highly heat resistant and also capable of withstanding heavy pressures. I have found that this particular material will effectively serve both as an electrical insulator for the electrodes and their associated supply leads, which will eliminate excessive energy loss and the danger of arcing, and as the means by which pressure may be applied to the work without warpage or excessive wear. Since there are substantially no metallic parts employed in the press blocks the desired uniformity of the electric field through the work may be readily achieved.

Conveniently, therefore, the electrodes 78 and 80 and their connecting leads 82 and 86 may be mounted directly on the lower, stationary press block 12 without need of any other basic means of support, and by employing blocks of considerable thickness the resulting capacity effect of the electrodes to ground is slight. This greatly simplifies the problem of matching the electrical impedance of the electrodes to that of a conventional high-frequency oscillator supplying the electrical energy. As an added feature, since it is especially important to preserve a true parallel relationship between the opposite faces of the two press blocks, in order to press firmly together all parts of the work acted upon with the same degree of force, I preferably construct each dielectric press block with a detachable face plate 74 and 76 of the same material as the blocks, which plates may be replaced whenever they become worn.

The electrodes 78 and 80 and the blocks 12 and 14 are made quite long in order to handle the work rapidly, and since the blocks are long I employ a multiple hydraulic jack mechanism for exerting downward pressure on the upper block at spaced points located intermediately of its ends. This reduces the deflecting moment arm of the block when pressure is applied to the work, compared with the case of a single such point of force application, any moment arm tending to allow certain deflection under pressure of the block, causing unequal distribution of pressure on the work. By so doing the uniformity of bonding pressure applied to the work parts is increased, but the jacks must be coordinated to realize this benefit. To insure effective coaction of the jacks the upper block must be maintained in parallel relation with the lower block as the former descends on the work. For this purpose coordinating mechanism is employed, later described, to the end that if one end of the block 14 tends to advance up or down at a more rapid rate than the other end, a corrective action is immediately imposed, tending to impede the motion of the advance end and aid that of the lagging end to maintain the desired equality of movement.

The work pieces to be bonded are first placed in their intended order upon the endless carrier belt 10. For example, as in Figure 5, the work pieces may be placed on the belt in two layers, the bottom layer comprising three parallel rows of short strips of wood in staggered relation, laid lengthwise of the board, and the other, superimposed layer comprising a continuous series of cross pieces, there being thermoactive adhesive, preferably of a rapidly curing type, applied between the layers. As the belt moves, the parts advance into position between press blocks 12 and 14, the lower block 12, and a surface extension thereof, 16, supporting the belt against sagging, in order to prevent disorganizing the work pieces as they are advanced by the belt. The belt is driven by a geared motor 18 and drive pulley 20 suitably coupled to the motor, as by a chain and sprocket drive, and an idler pulley 22. The pulleys are of such diameter that the loop of the belt will encircle the lower press block 12 and the bed plate 24 on which it is supported. The machine rests on a base generally designated at 26. The belt is sandwiched between the lower press block 12 and the work during bonding and it is for this reason principally that the belt is formed of dielectric, highly heat resistant material, such as of cotton or canvas webbing, preferably treated so that glue will not stick to it. Were it of metal, it would tend to distort or by-pass the electric field to disadvantage.

The upper press mechanism is suspended from an overhead girder 28 mounted on the corner strain rods or columns 30. The upper press block 14 is carried directly by a longitudinal beam 32, connected at spaced points between its ends to the lower end of the coacting hydraulic jacks generally indicated as 33 and 35. These jacks, carried by a common base plate 34 bolted to the bottom of the girder 28, include vertically reciprocable pistons 36 and 38 coacting respectively with hydraulic cylinders 40 and 42, into the opposite ends of which liquid under pressure may be injected, and withdrawn through pipes 44 and 46. The fluid pressure system (not shown) supplying and exhausting the liquid from the ends of the hydraulic cylinder may be controlled electrically, such as by a solenoid operated valve or similar well known means. Thus, the upper press block 14 may be raised by increasing the fluid pressure in the pipe 46 while decreasing the pressure in the pipe 44, and lowered by the opposite procedure.

In a case such as the present one, wherein the work parts must be pressed together equally and during the same interval of time, namely, the heating interval, to obtain uniform results, the hydraulic jacks must act together or lose valuable operating time while there is a pressure equalization between them, during the initial period following lowering of the upper press block against the work, if the ends of the block do not move downwardly together. To insure that the upper press block 14 will be raised and lowered with its lower face in parallelism with the upper face of the lower block 12, and, when descended, will produce an equalized pressure immediately over the area of the work, the beam 32 carries longitudinal rotatable shafts 58 and 60, mentioned previously, which are journaled in ears 62 and 64 projecting laterally from the ends of the beam. Because pinions 66 carried by the opposite ends of shaft 58 engage fixed gear racks 68, and pinions 70 carried by shaft 60 engage gear racks 72, should one end of the upper press block 14 tend to rise or fall more rapidly than the other end, the pinions at one end of the beam 32 will produce a torque in the shafts which will turn the pinions at the opposite end to preserve the desired equalization of movement and pressure.

The amount of lift of the press block 14 may be determined by an adjustable mechanical stop mechanism in the form of a downwardly projecting sleeve 48 into which is threaded a screw 50. The end of the screw carries a head 52 fixed to it, having a hand wheel 54 for rotating the screw in the threaded sleeve 48 to raise and lower its position. The lower end of the head 52 acts as the stop, engageable with the longitudinal beam 32, to limit the upward movement of the upper press block which it carries, when such beam is raised by the jacks 33 and 35. A jam nut 56 is employed to lock the position of the stop, and this position may be adjusted, if desired, in accordance with changes in the thickness of the work being pressed, it being desirable for time saving purposes to limit the separation of the press blocks to an amount which is little more than ample to provide clear passage for movement of the work.

The parallel conductive strip electrodes 78 and 80 running lengthwise of the press are preferably somewhat shorter in length than the press blocks, and are of a cross-sectional height which may be equal to or somewhat less than the greatest expected work thickness, it being sufficient that they adequately span the glue line. These strips may be cocked somewhat upwardly and outwardly so that their lower edges may bear lightly against the lower, longitudinal strips of the work while the upper edges of the electrodes do not quite contact the work, and hence cannot displace the light cross strips laid on the lower or backing layer.

It is preferable to minimize the cross-sectional dimension of the electrodes in order to localize the field in the work and avoid ineffective heating of the press blocks themselves, and to reduce the stray fields to ground. The group of flexible spring arms supporting each electrode urges it lightly against the work to prevent an appreciable air gap occurring between the electrode and the work. The electrode 78 is carried by a group of supporting arms 82 mounted at their lower ends on insulating supports 84, and the electrode 80 is carried by arms 86 mounted on similar supports 88. The supporting arms also serve to distribute high-frequency current to the electrodes, and for that reason may be made of beryllium-copper alloy or of some other suitable springy material which is also of good conductive qualities.

The insulating supports 84 and 88 are mounted on the opposite sides of the lower press block, and they include the respective binding posts 90 and 92 as a means of connecting the electrical conductors 94 and 96 to the respective two groups of supporting arms. Input lead 96 includes a short conductor 98 which is carried by an insulating post 99 through which a conductive bolt passes and extends through the body of the press block to a similar insulating post 101 at the other side of the block, and there connects to the conductor 98'. The conductors 94 and 98' constitute suitable electrical leads for the delivery of high-frequency energy from an oscillator source (not shown).

In coordinating the operation of the press and, concurrently, of the supply of high-frequency energy to the electrodes with the intermittent work-feed motion of the belt 19, an electrical switching unit coacting with the belt mechanism is employed, which stops the belt each time it has traveled a predetermined distance, then effects actuation of the pressure system controlling the hydraulic jacks and initiates operation of the high-frequency energy source, thus commencing the heat-pressure cycle. This cycle may be terminated in any suitable way, such as automatically by suitable time-switching apparatus (not shown) associated with the high-frequency oscillator and press control mechanism, which apparatus may start the belt in motion again for advancing the next section of work toward bonding position and move the bonded section forwardly out of the press.

In order to stop the belt automatically after it has advanced far enough to bring the next section of work into bonding position, further switch mechanism is employed which includes an arm-actuated switch 100 controlling an energized circuit (not shown) for motor 18, which switch may be actuated with each revolution of an eccentric 102 engaged by the switch arm 104. The eccentric is rotated by a larger, concentric wheel 106 which is rotated by its frictional engagement of the flat side of a disk 108 rotating with the shaft 110 comprising the drive shaft for the main pulley 20. The disk 108 is urged into continuous engagement with the wheel 106, by means of a helical spring 112 encircling the end of shaft 110 and compressed between the disk and a fixed washer 114 held at the end of such shaft by a nut 116. The frequency of operation of the switch 100 relative to rotations of the shaft may be regulated initially by the adjustment of the position of the wheel 106 to vary its contact radially of wheel 108.

To this end, the wheel 106 and eccentric 102 are journaled to rotate on a vertical shaft 118, the upper portion of which is threaded in a plate 120 and lock-adjustment collar 122. The position of the wheel on the disk may then be adjusted by rotating the shaft 118 until the switch 100 operates with the throw of the eccentric 102 each time the carrier belt has moved the correct distance to transport a new section of work into position between the press blocks and the electrodes. Once adjusted, the position of the wheel may be locked by tightening the collar 122, and need not thereafter be altered unless the device comes out of adjustment or the machine is to be operated differently.

After each heating and pressing cycle, the board including both bonded and unbonded sections, will be advanced further by the belt 10, the freshly bonded work sections then passing between the drive pulley 20 and the weighted roller 124 carried by swinging arms 126 which are pivotally mounted on suitable brackets 128 secured to strain rods 30 at the output end of the press. The weighted roller helps insure sticking together of the bonded parts by subjecting them to a final application of pressure, and also it serves to hold the work down on the belt despite a tendency for it to stick to the upper press member as the latter is raised.

I claim as my invention:

1. In a machine adapted for manufacturing laminated boards from material strips prearranged in contacting layers, the combination of a stationary lower press member of dielectric material, an upper dielectric press member movable vertically in relation to the lower member to press work materials between them, a work-carrier belt of dielectric material having one stretch disposed between said members and receiving support against sagging from said lower press member, said belt being operable to carry assembled work pieces progressively into the space between said press members and discharge them therebeyond, and elongated parallel electrodes disposed adjacent to the opposite edges of the belt stretch between said press members, and operable to set up a high-frequency field in a plane parallel to and immediately above such belt stretch for setting a layer of thermal-setting adhesive located between contacting material layers lying on said belt stretch between said press members.

2. The machine defined in claim 1, and resilient supporting members carrying the electrodes and operable to press the electrodes lightly against the opposite lateral sides of the assembled material strips to guide such strips for movement between the press members.

3. The machine defined in claim 2, wherein the resilient supporting means comprise a plurality of upwardly projecting spring arms supported by their lower ends at the opposite sides of the stationary lower press member at interval locations lengthwise thereof, and carrying at their upper ends the electrodes.

4. The machine defined in claim 2, and board-restraining means supported for continuous engagement with the bonded board product at a location beyond the discharge ends of the press members and operable to maintain intimate transporting relationship between the belt and the bonded sections of board issuing from the electrodes and press members during continued movement of the belt.

5. In a machine adapted for manufacturing laminated boards from material strips prearranged in contacting layers, the combination of a pair of coacting press blocks formed of dielectric material, one such block being stationary and the other guided for movement relative thereto, parallel dielectric-heating electrode members positioned adjacent to the respective opposite edges of the working face of the stationary block and interconnected mechanically with said block to support said electrode means thus positioned, and a work carrier belt of dielectric material passing between and generally parallel to said electrodes, through the space between said blocks to convey material strips therebetween.

6. The machine defined in claim 5 in which the press blocks are made of melamine formaldehyde bonded fish paper.

7. Apparatus as defined in claim 5 in which the press blocks have replaceable facings of the same material as that of the blocks.

EDWARD L. CROSTON.

REFERENCES CITED

The following references are of record in the file of this patent:

UNITED STATES PATENTS

| Number | Name | Date |
|---|---|---|
| 994,349 | Updegraff | June 6, 1911 |
| 1,469,689 | Prius | Oct. 2, 1923 |
| 1,506,789 | Sutherland | Sept. 2, 1924 |
| 1,628,257 | Mallory | May 10, 1927 |
| 1,702,185 | Weber | Feb. 12, 1929 |
| 1,949,917 | Muench | Mar. 6, 1934 |
| 1,977,199 | Osgood | Oct. 16, 1934 |
| 2,050,191 | Liebowitz | Aug. 4, 1936 |
| 2,231,457 | Stephen | Feb. 11, 1941 |
| 2,317,281 | Linquist | Apr. 20, 1943 |
| 2,365,849 | Strauss | Dec. 26, 1944 |
| 2,377,868 | D'Alelio | June 12, 1945 |
| 2,400,667 | Toews | May 21, 1946 |
| 2,441,699 | Gramelspacher | Mar. 18, 1948 |
| 2,453,185 | Bilhuber | Nov. 9, 1948 |

FOREIGN PATENTS

| Number | Country | Date |
|---|---|---|
| 699,600 | Germany | Dec. 3, 1940 |